(12) United States Patent
Gieseke

(10) Patent No.: US 7,434,758 B2
(45) Date of Patent: Oct. 14, 2008

(54) CONSTRUCTION KIT FOR A SPRING-DRIVEN CABLE DRUM

(75) Inventor: Christoph Gieseke, Cologne (DE)

(73) Assignee: IPALCO B.V., Alblasserdam (NL)

( * ) Notice: Subject to any disclaimer, the term of this patent is extended or adjusted under 35 U.S.C. 154(b) by 364 days.

(21) Appl. No.: 10/552,670

(22) PCT Filed: Apr. 9, 2004

(86) PCT No.: PCT/EP2004/050496

§ 371 (c)(1),
(2), (4) Date: Oct. 5, 2005

(87) PCT Pub. No.: WO2004/089799

PCT Pub. Date: Oct. 21, 2004

(65) Prior Publication Data

US 2006/0185953 A1    Aug. 24, 2006

(30) Foreign Application Priority Data

Apr. 11, 2003    (EP)    .................................. 03100990

(51) Int. Cl.
B65H 75/48    (2006.01)
(52) U.S. Cl. .................................................... 242/372
(58) Field of Classification Search ................ 242/372, 242/375, 375.3, 394, 394.1, 598.3; 191/12.2 R, 191/12.4, 12.2 A
See application file for complete search history.

(56) References Cited

U.S. PATENT DOCUMENTS 1,941,880 A * 1/1934 Earll .......................... 242/382
4,123,013 A * 10/1978 Bottrill et al. ............... 242/372

FOREIGN PATENT DOCUMENTS

DE    649120    8/1937
EP    0802601    10/1997

OTHER PUBLICATIONS

Translation of EP 0,802,601 A2.*

* cited by examiner

Primary Examiner—Peter M. Cuomo
Assistant Examiner—William E Dondero
(74) Attorney, Agent, or Firm—McCormick, Paulding & Huber LLP

(57) ABSTRACT

A construction kit for a spring-driven cable drum includes a pre-assembled drum core, the housing of which constitutes a winding surface for the cable and containing at least one spiral spring and at least one spring anchor hub. The pre-assembled drum core is provided with an axle channel passing right through it but no axle. The spring anchor hub is maintained to all intents and purposes coaxial with this axle channel by the spiral springs. The construction kit further includes a separate axle which can be inserted from either side into the axle channel of the pre-assembled drum core, insertion of the axle into the axle channel establishing a form-fit rotary coupling between the spring anchor hub and the axle.

14 Claims, 4 Drawing Sheets

CONSTRUCTION KIT FOR A SPRING-DRIVEN CABLE DRUM

CROSS-REFERENCE TO RELATED APPLICATIONS

This application is entitled to the benefit of International Application No. PCT/EP2004/050496 filed on Apr. 9, 2004, and European Patent Application No. 03 100 990.5 filed on Apr. 11, 2003.

FIELD OF THE INVENTION

This invention relates to a cable drum in general and a construction kit for such a drum in particular.

BACKGROUND OF THE INVENTION

1. Prior Art

Known cable drums comprise a drum body which is supported in bearings free to rotate on an axle and forms a winding surface for a cable between two lateral round plates. One or more spiral springs exert a force opposite to the direction of unwinding, so that while it is being unwound, the cable is kept under initial tension. As derivatives, there are cable drums designed to unwind to the left and cable drums designed to unwind to the right.

To simplify stock management, EP 0802601 proposes a spring-driven cable drum, which can be converted so as to unwind in the desired direction. These cable drums consist basically of a drum shell forming the winding surface for the cable, two lateral drum plates, one of them incorporating a bearing, a slip ring unit with a common axle, a lateral fixing flange for the free end of this axle, an enclosed spring cassette pushed on to the axle over a spring anchor hub and a set collar to fix the spring nut on the axle. Should a change of unwinding direction from left to right be desired, the fixing flange is freed and the drum plate and bearing withdrawn from the axle. The spring cassette and the spring anchor hub can then be taken out of the drum shell, as also the set collar. The spring cassette, spring anchor hub and set collar are then turned through 180° and pushed on to the common axle again in reverse order. Finally, the drum plate with the bearing and the fixing flange are fitted again. As this conversion is relatively complicated, it normally has to be carried out by a specialist.

A task of this invention was to make available to the end user a construction kit with which he could build, all in one and in the simplest possible way, a cable drum unwinding to the left and a cable drum unwinding to the right. This task is fulfilled by a construction kit according to the present invention.

2. Description of the Invention

OBJECTS AND SUMMARY OF THE INVENTION

A construction kit for a spring-driven cable drum according to the invention consists of a pre-assembled drum core the housing of which forms a winding surface for the cable and containing at least one spiral spring and at least one spring anchor hub, this pre-assembled drum core having an axle channel without an axle passing right through it and the spring anchor hub being fixed to all intents and purposes axially to this axle channel. This construction kit is supplied with a separate axle which can be inserted into the axle channel from either side of the pre-assembled drum core, so designed that the insertion of the axle in either direction creates a form-fit rotary coupling between the spring anchor hub and the axle. Use of this kit provides the means to determine the unwinding direction of the cable drum in the simplest possible way by turning the whole pre-assembled drum core round. It may be noted furthermore that such a construction kit according to the invention can be very easily and safely packed for dispatch.

The form-fit rotary coupling between the spring anchor hub and the axle can consist, for example, of a spline or a key. By preference, a cylindrical key will be used, fitting loosely into a longitudinal bore in the spring anchor hub, the axle being provided with a longitudinal cylindrical key groove.

The pre-assembled drum core is preferably provided with two ball bearings of equal size, each one constituting an exit hole of the axle channel, thus providing symmetrical support for the cable drum.

In its standard version, the construction kit also includes a fixing flange which is or can be fixed to one end of the axle. This fixing flange can then advantageously be provided with a cylindrical extension of such size as to form a close sliding fit with the inner ring of the ball bearing. In the inner ring of the other ball bearing, a bush can then advantageously be fitted, similarly of such size as to form a close sliding fit with this inner ring.

For most applications, the construction kit also includes a slip ring unit with a fixed slip ring stack clamped to the other end of the axle and a slip ring unit housing. On each side of the pre-assembled drum core, means of attachment for the slip ring unit housing are then provided, so that the slip ring unit can be fixed to either side of the pre-assembled drum core, depending on the desired direction of unwinding.

Two spring units are normally arranged inside the pre-assembled drum core. The first spring unit comprises a first spring cassette and a first spiral spring, the outer end of the first spiral spring being supported by the first spring cassette. The second spring unit comprises a second spring cassette and a second spiral spring, the outer end of the second spiral spring being supported by the second spring cassette. A first spring anchor hub is supported by the inner end of the first spiral spring co-axially with the axle channel.

In a first embodiment, a second spring anchor hub is supported by the inner end of the second spiral spring axially in the axle channel. When the axle is inserted in the axle channel, a form-fit rotary coupling is constituted between the first spring anchor hub and the axle and between the second spring anchor hub and the axle. In this first embodiment, both spring cassettes are attached to the drum core, unable to rotate with respect to the latter, so that the first and second spiral springs are coupled in parallel. For the attachment of at least one of the spring cassettes, unable to rotate with respect to the housing of the drum core, the construction kit advantageously includes at least one locking pin.

In a second embodiment, a second spring anchor hub is attached to the first spring cassette, unable to rotate with respect to the latter. When the axle is inserted in the tube, a form-fit rotary coupling is constituted between the first spring anchor hub and the axle, but not between the second spring anchor hub and the axle. In this embodiment, the second spring cassette is fixed, unable to rotate, to the drum core, but the second spring cassette is not, so that the first and second spiral springs are coupled in series.

The pre-assembled drum core is preferably mounted on a cylindrical body, the outer surface of which forms a direct winding surface for a cable. The construction kit includes a set of round plates, one of which can be attached to each side of the pre-assembled drum core. As round plates of a variety of sizes and designs can be screwed on to the drum core, a single drum core can cover a wide field of applications. This also makes it much easier to protect the round plates, which are not yet fitted to the drum core, against damage during transport.

BRIEF DESCRIPTION OF THE DRAWINGS

In what follows, the invention will be described in greater detail with reference to the attached drawings. These show the following.

DETAILED DESCRIPTION OF THE INVENTION

Figure 1:
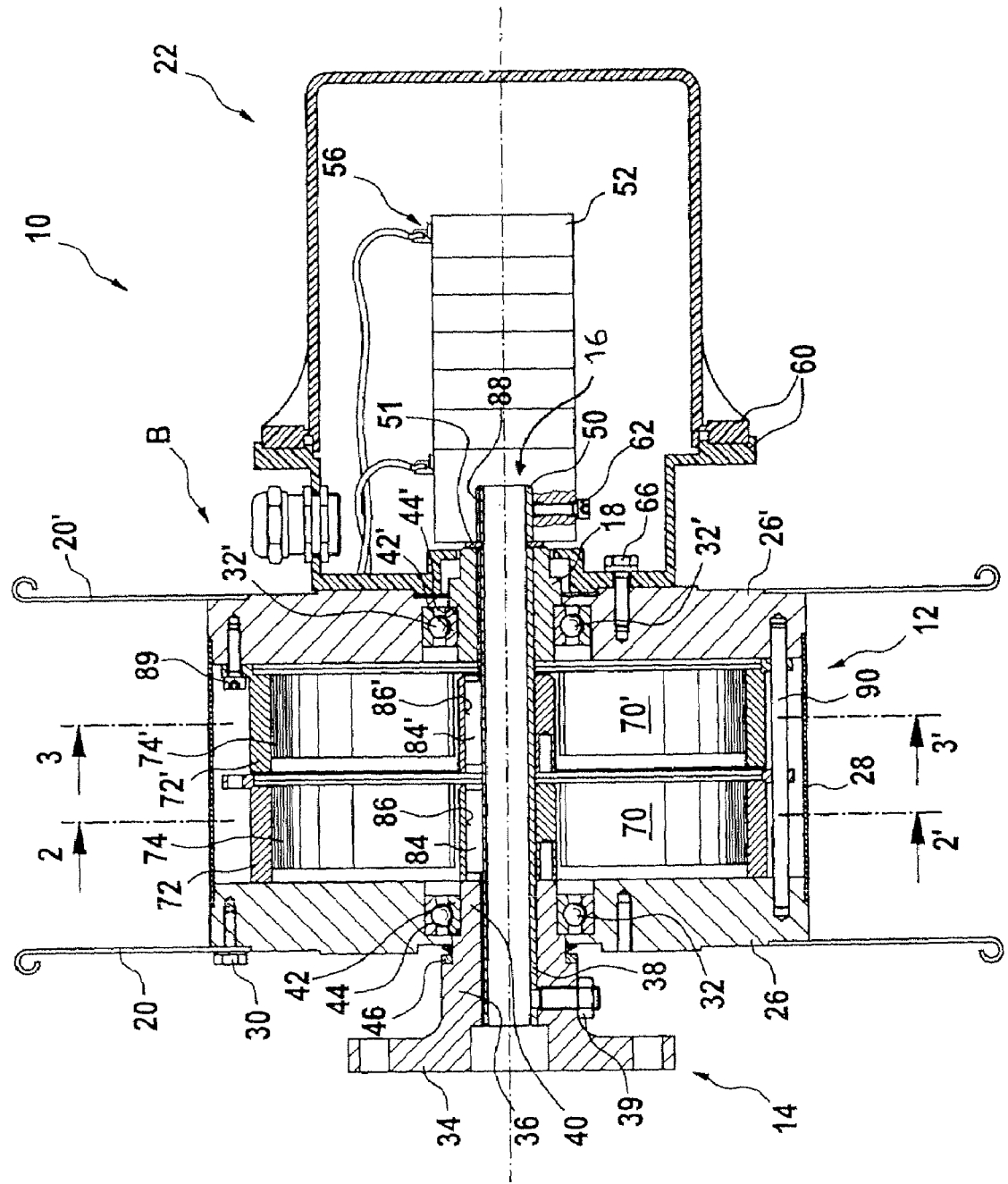
FIG. 1: a longitudinal section through a spring-driven cable drum, with two spiral springs coupled in parallel.

The spring-driven cable drum 10 shown in the Figures is assembled from a construction kit according to the invention, for which essentially the following components are required: a pre-assembled drum core 12, a fixing flange 14, an axle 16, a bush 18, a pair of round plates 20, 20' and a slip ring unit 22.

The pre-assembled drum core 12 comprises a cylindrical housing which basically consists of two end plates 26, 26' and a shell 28. The two end plates 26, 26' are held together axially by screwed rods (not shown). The shell 28 is clamped between the two end plates 26, 26' and forms a winding surface for a cable (not shown). This winding surface is bounded laterally by the two round plates 20, 20', which are fastened by means of screws 30 (indicated only by dotted lines) to the end plates 26, 26'. Each of the end plates 26, 26' is mounted on a ball bearing 32, 32' with its outer ring pressed into a bore. The two ball bearings 32, 32' are identical and in particular have an identical internal bearing diameter. They constitute the openings at the ends of an axle channel in the pre-assembled drum core 12.

The fixing flange 14 comprises a fixing plate 34 and a socket 36 centrally bored to accommodate the axle 16. The latter has an assembly end 38 which is inserted in the bore in the socket 36 and held there by a clamping screw 39. The front end of the socket 36 takes the shape of a cylindrical extension 40 of such size that it forms a close sliding fit in the inner ring of the ball bearing 32. The inner ring 42 is positioned coaxially and in contact with a shoulder surface 44 of the socket 36. A lip seal 46 seals the annular crevice between the end plate 26 and the socket 36.

The second ball bearing 32' accommodates the bush 18 which is similarly of such size as to form a dose sliding fit in the inner ring 42' of the ball bearing 32'. The bush 18 can be slid along the axle 16 and is positioned with a shoulder surface 44' in contact with the inner ring 42 of the ball bearing 3Z. The other end 50 of the axle 16 projects out of the bush 18. The bush 18 is held in place longitudinally on the axle 16 by means of a retaining ring 51. The longitudinally secured bush 18 thus holds the pre-assembled drum core 12 with the inner ring 42 of its ball bearing 32 in contact with the shoulder surface 44 of the fixing flange 14 opposite to it. The retaining ring 51 may be, for example, a retaining ring to DIN 471.

The slip ring unit 22 comprises in its essentials a slip ring stack 52 with slip rings, collector brushes 56 and an enclosed housing 60 in two parts. The slip ring stack 52 is fastened to the second end 50 of the axle 16 by a locking screw 62. The housing 60 is screwed to the end plate 26' with screws 66. The collector brushes 56 are fixed to the housing 60. When the drum core 12 rotates about the axle 16, the collector brushes 56 consequently rotate about the stationary slip ring stack 52.

Figure 2:
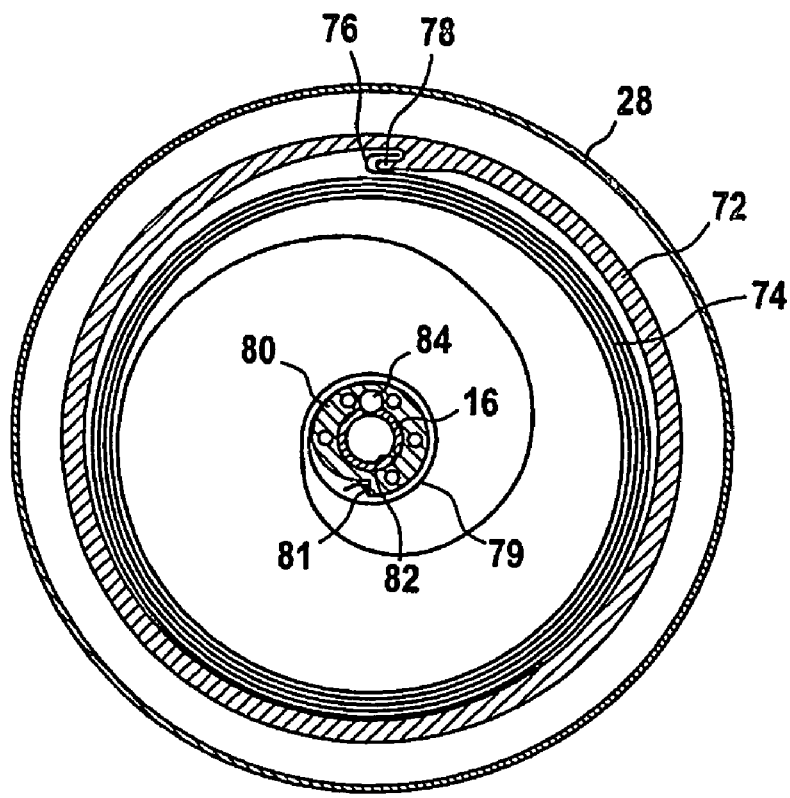
FIG. 2: a cross section along the line 2-2' in FIG. 1.
Figure 3:
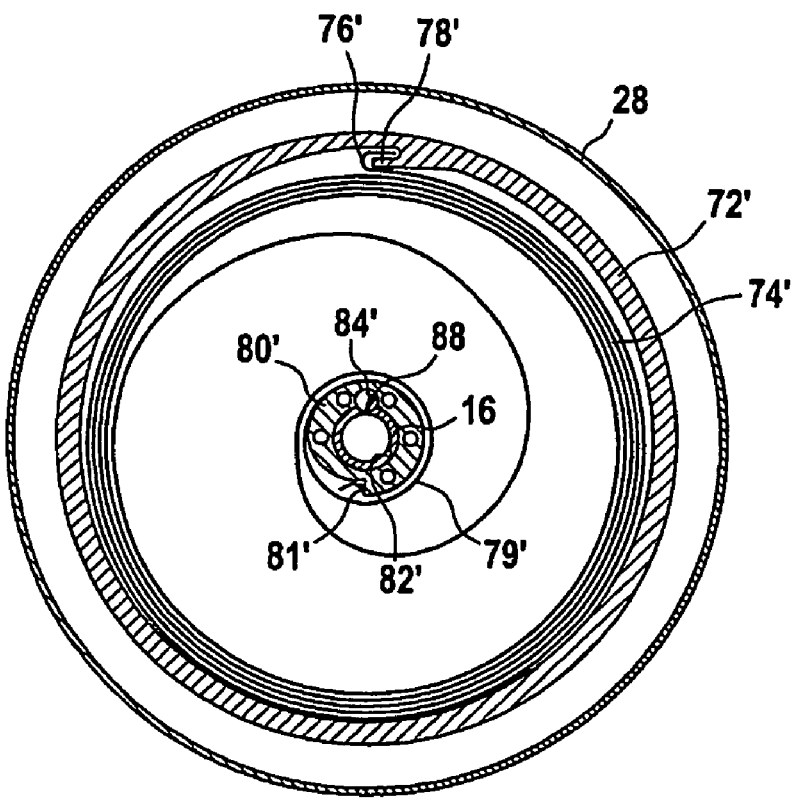
FIG. 3: a cross section along the line 3-3' In FIG. 1.

Inside the drum core 12 two spring units 70, 70' are arranged axially one behind the other between the two end plates 26, 26'. Each spring unit 70, 70' contains a spring cassette 72, 72' and a spiral spring 74, 74' enclosed in the spring cassette 72, 72'. As shown in FIGS. 2 and 3, the outer end 76, 76' of each of the spiral springs 74, 74' engages with an anchor strip 78, 78' in the spring cassette 72, 72'. Inside the innermost spiral coil 79, 79' of each spiral spring 74, 74' a spring anchor hub 80, 80' is provided. The inner end of the spiral spring 74, 74' seats here on a shoulder surface 81, 81' of its spring anchor hub 80, 80'. It may also be noted that when the axle 16 is removed, the spring anchor hub 80, 80' of each spiral spring 74, 74' is held to all intents and purposes on the axis of the open axle channel of the pre-assembled drum core 12.

Each of the spring anchor hubs 80, 80' has a hole 82, 82' for the axle 16 bored through it. By means of a key 84 or 84', as the case may be, a form-fit coupling can be effected between the spring anchor hub 80 or 80', as the case may be, and the axle 16 by the insertion of the axle 16 into the axle channel, so that the inner end of the spiral spring 74, 74' can be fixed to the stationary axle 16 by means of the spring anchor hub 80 or 80', as the case may be. The keys 84, 84' should preferably by cylindrical keys pushed into key grooves 86, 86' in the spring anchor hubs 80, 80'. These key grooves 86, 86' are positioned in the spring anchor hubs 80, 80' along the length of the holes 82, 82' In such a way that the cylindrical keys 84, 84' project partially into the holes 82, 82'. When the axle 16 is inserted, the cylindrical key 84, 84' interacts with a cylindrical key groove 88 made longitudinally in the outer surface of the axle 16. This creates a form-fit rotary coupling between the spring anchor hub 80 or 80', as the case may be, and the axle 16. However, if no key is inserted in the key grooves 86, 86' of the spring anchor hubs 80, 80', these spring anchor hubs 80, 80' can be rotated with respect to the axle 16.

In the embodiment shown in FIGS. 1 to 3, a key 84, 84' has been inserted in the key groove 86, 86' of each of the spring anchor hubs 80, 80'. The spring cassettes 72, 72' are also attached, unable to rotate, to the housing. For this purpose, the spring cassette 72' can for example be screwed firmly to the end plate 26' by means of screws 89, and the spring cassette 72 can be locked unable to rotate by means of pins 90. By this means, the two spiral springs 74, 74' are coupled in parallel, thus doubling their available spring force.

Figure 4:
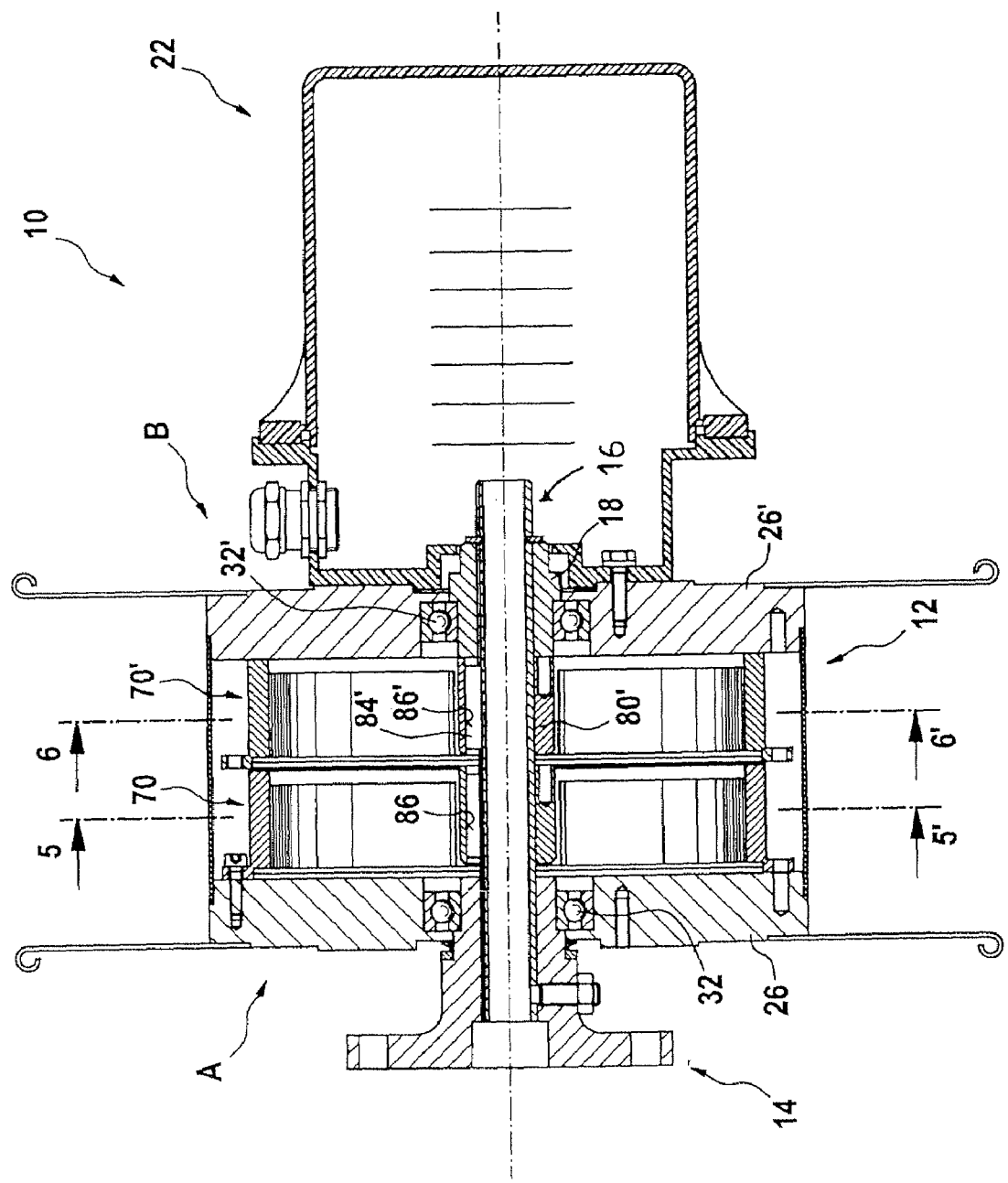
FIG. 4: a longitudinal section through a spring-driven cable drum, with two spiral springs coupled in series.
Figure 5:
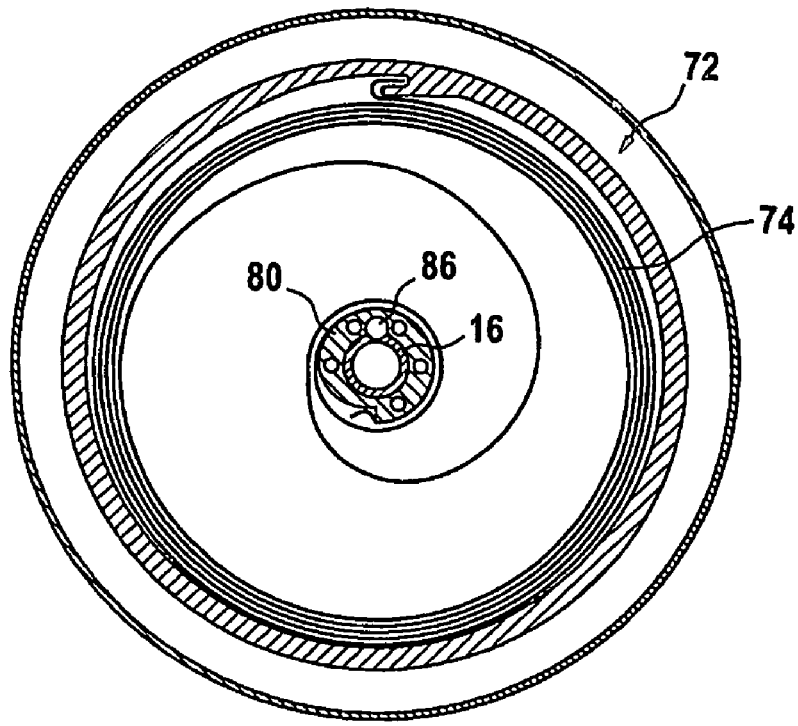
FIG. 5: a cross section along the line 5-5' in FIG. 4.
Figure 6:
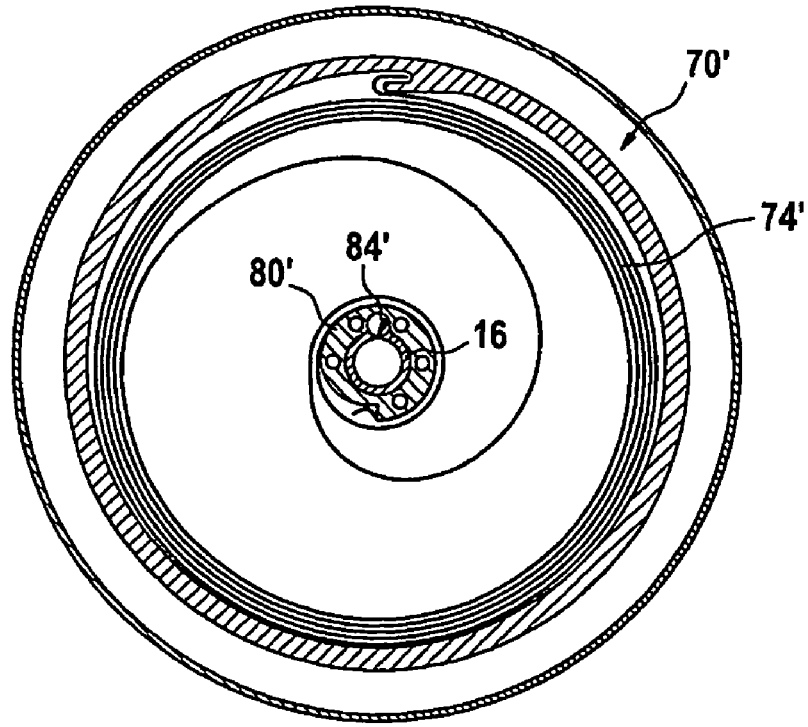
FIG. 6: a cross section along the line 6-6' in FIG. 4.

In the embodiment shown in FIGS. 4 to 6, a key 84' is inserted in the key groove 86' of the spring anchor hub 80'. The key groove 86 of the spring anchor hub 80, however, to which the spring cassette 72' is screwed, is empty. The spring cassette 72 is attached unable to rotate to the drum core 12, while the spring cassette 72' is not. By this means, the two spiral springs 74, 74' are coupled in series, thus doubling their available retraction capacity.

It should be noted that it is possible to reverse the direction of unwinding of the spring-driven cable drum 10 without extracting the spring units 70, 70', and even without opening the drum core 12. In fact, the unwinding direction of the spring-driven cable drum 10 can be set simply by fitting the fixing flange 14 either to side A or to side B of the drum core 12. To reverse the unwinding direction of the spring-driven cable drum 10 in FIG. 1 or 2, it is thus only necessary to remove the slip ring unit 22, then pull the drum core 12 off the axle 16, extract the bush 18 from the ball bearing 32' and insert it in the ball bearing 32 before putting the drum core 12 back on to the axle 16, this time with side B towards the fixing flange 14, and mounting the slip ring unit 22 on side A of the drum core 12.

It should also be noted that a construction kit for a spring driven cable drum according to the invention can be packed for transport relatively easily and safely because the pre-assembled drum core 12, the axle 16, the round plates 20, 20' and the slip ring unit 22 can be packed in the crate as separate parts.

The spring-driven cable drum 10 can be very easily assembled by the customer, who can choose the desired unwinding direction of the spring-driven cable drum 10 during assembly at no additional cost, simply by positioning either side A or side B of the drum core 12 against the fixing flange 14.

The fact that round plates 20, 20' in a variety of sizes and versions can be screwed on to the drum core 12 means that a single drum core 12 can be used for a wide field of applications.

By coupling the spiral springs 74, 74' either in parallel or in series as described above, it is possible in the simplest possible way to double their spring force or retraction capacity respectively.

The invention claimed is:

1. A construction kit for a spring-driven cable drum, comprising:
    a pre-assembled drum core having a housing which forms a winding surface for the cable and which contains at least one spiral spring and at least one spring anchor hub, said pre-assembled drum core having an axle channel passing right through it with no axle, and said spring anchor hub being held in a substantially axial way within said axle channel by said spiral spring; and
    a separate axle which can be axially inserted into said axle channel from either side of said pre-assembled drum core, wherein insertion of said axle into said axle channel establishes in either case a form-fit rotary coupling between said spring anchor hub and said separate axle.

2. The construction kit according to claim 1, wherein said form-fit rotary coupling between said spring anchor hub and said axle is provided by a key.

3. The construction kit according to claim 2, wherein:
    said form-fit rotary coupling between said spring anchor hub and said axle is provided by a cylindrical key which is housed with a loose fit in a longitudinal bore provided in said spring anchor hub;
    and said axle is provided with a longitudinal cylindrical key groove.

4. The construction kit according to claim 1, wherein said pre-assembled drum core is equipped with two ball bearings of equal size, each forming one exit hole of said axle channel in said drum core.

5. The construction kit according to claim 4, including a fixing flange which can be fixed to one end of said axle and has a cylindrical extension dimensioned so as to form with said inner ring of said two ball bearings a sliding fit.

6. The construction kit according to claim 5, including a bush which is inserted into said inner ring of said opposite ball bearing and is dimensioned so as to form a sliding fit with the latter.

7. The construction kit according to claim 6, comprising a locking means to axially lock said bush on said axle.

8. The construction kit according to claim 1, further comprising a slip ring unit including:
    a fixed slip ring stack clamped to said second end of said axle; and
    a slip ring unit housing with collector brushes;
    wherein said pre-assembled drum core is provided on both sides with means of attachment for said slip ring unit housing, so that said slip ring unit can be mounted on either side of said pre-assembled drum core depending on the desired direction of unwinding.

9. The construction kit according to claim 1, said pre-assembled drum core containing:
    a first spring unit comprising a first spring cassette and a first spiral spring, wherein an outer end of said first spiral spring is seated on said first spring cassette;
    a first spring anchor hub, which is held axially in said axle channel by said outer end of said first spiral spring;
    a second spring unit comprising a second spring cassette and a second spiral spring, wherein an outer end of said second spiral spring is seated on said second spring cassette; and
    a second spring anchor hub.

10. The construction kit according to claim 9, wherein:
    said second spring anchor hub is held axially in said axle channel by said outer end of said second spiral spring;
    a form-fit rotary coupling is formed between said first spring anchor hub and said axle and between said second spring anchor hub and said axle, when said axle is inserted into said axle channel;
    and the two spring cassettes are fixed in a rotation transmitting way to said housing of said drum core so that said first and second spiral springs are coupled in parallel.

11. The construction kit according to claim 10, including at least one pin for fixing at least one of said spring cassettes in a rotation transmitting way to said housing of said drum core.

12. The construction kit according to claim 9, wherein:
    said second spring anchor hub is fixed in a rotation transmitting way to said first spring cassette;
    insertion of said axle into said axle channel results in a form-fit rotary coupling between said first spring anchor hub and said axle, but not between said second spring anchor hub and said axle; and
    said second spring cassette is fixed in a rotation transmitting way to said housing of said drum core, but said first spring cassette is not fixed in a rotation transmitting way to said housing of said drum core, so that said first and second spiral springs are coupled in series.

13. The construction kit according to claim 1, wherein said housing of said pre-assembled drum core is a cylindrical body having a shell that directly forms a winding surface for a cable.

14. The construction kit according to claim 13, including a set of round plates, one of said round plates being attached to each side of said pre-assembled drum core.

* * * * *